United States Patent
Poggio et al.

(10) Patent No.: US 6,516,608 B1
(45) Date of Patent: Feb. 11, 2003

(54) METHOD FOR CONTROLLING THE INJECTION AND IGNITION IN A DIRECT-INJECTION ENDOTHERMIC ENGINE, IN ORDER TO ACCELERATE HEATING OF THE CATALYTIC CONVERTER

(75) Inventors: Luca Poggio, Spinetta Marengo (IT); Marco Secco, Nizza Monferrato (IT); Andrea Gelmetti, Bologna (IT)

(73) Assignee: Magneti Marelli S.p.A., Milan (IT)

( * ) Notice: Subject to any disclaimer, the term of this patent is extended or adjusted under 35 U.S.C. 154(b) by 0 days.

(21) Appl. No.: 09/448,461

(22) Filed: Nov. 24, 1999

(30) Foreign Application Priority Data

Nov. 26, 1998 (IT) .................... B098A 000661

(51) Int. Cl.⁷ .............................. F01N 3/00
(52) U.S. Cl. ............................ 60/284; 60/286; 60/285; 60/299; 60/300
(58) Field of Search .................. 60/274, 284, 285, 60/286, 300, 295; 123/300

(56) References Cited

U.S. PATENT DOCUMENTS

| | | | | |
|---|---|---|---|---|
| 5,207,058 A | * | 5/1993 | Sasaki et al. ................ | 60/284 |
| 5,479,775 A | * | 1/1996 | Kraemer et al. ............. | 60/285 |
| 5,642,705 A | * | 7/1997 | Morikawa et al. ........... | 60/285 |
| 5,775,099 A | * | 7/1998 | Ito et al. ..................... | 60/274 |
| 5,839,275 A | * | 11/1998 | Hirota et al. ................ | 60/285 |
| 6,041,591 A | * | 3/2000 | Kaneko et al. .............. | 60/284 |
| 6,044,642 A | * | 4/2000 | Nishimura et al. .......... | 60/285 |
| RE36,737 E | * | 6/2000 | Brehob et al. ............... | 60/284 |
| 6,109,024 A | * | 8/2000 | Kinugasa et al. ............ | 60/285 |

FOREIGN PATENT DOCUMENTS

| | | |
|---|---|---|
| EP | 0826869 | 3/1998 |
| EP | 0831226 | 3/1998 |
| EP | 0856655 | 8/1998 |
| FR | 2721653 | 12/1995 |
| GB | 2301459 | 12/1996 |

OTHER PUBLICATIONS

EPO Search Report, dated Apr. 2, 2000.

PCT Publication, WO 98/44245, dated Oct. 8, 1998.

* cited by examiner

*Primary Examiner*—Thomas Denion
*Assistant Examiner*—Diem Tran
(74) *Attorney, Agent, or Firm*—Liniak, Berenato & White

(57) ABSTRACT

Method for controlling the injection and ignition in a direct-injection endothermic engine, in order to accelerate heating of a catalytic converter, which is disposed along the exhaust pipe of the engine, The method comprising the steps of executing, during a single cycle of the engine, and for each cylinder of the engine itself, at least a first injection of fuel, during suction stroke and/or compression stroke of the cylinder itself, in order to supply a weak mixture; priming combustion in each cylinder, at a priming moment which is pre-determined such that the combustion in each cylinder generates the same torque; and executing, in at least one cylinder of the engine, a second injection of fuel, during the exhaust stroke of the cylinder itself, such that the ratio of air/fuel of the mixture as a whole, which is supplied to the cylinder during suction stroke, compression stroke, expansion stroke and exhaust stroke, is close to the stoichiometric value; the fuel which is injected in the said second injection giving rise to residual combustion in the presence of the oxygen-rich exhaust gases, which are derived from the combustion of the weak mixture; the residual combustion not affecting the torque generated, and producing heat in order to speed up heating of the catalytic converter.

8 Claims, 3 Drawing Sheets

METHOD FOR CONTROLLING THE INJECTION AND IGNITION IN A DIRECT-INJECTION ENDOTHERMIC ENGINE, IN ORDER TO ACCELERATE HEATING OF THE CATALYTIC CONVERTER

The present invention relates to a method for controlling the injection and ignition in a direct-injection endothermic engine, in order to accelerate heating of the catalytic converter.

BACKGROUND OF THE INVENTION

In vehicles which are provided with a direct-injection endothermic engine, i.e. which are provided with injectors which are disposed directly facing the combustion chambers, in order to inject the fuel into the latter, it is known to install a catalytic converter along the exhaust pipe, in order to suppress the pollutant substances which are present in the exhaust gases output by the engine.

Correct functioning of the catalytic converter is dependent on the fact that the temperature of the converter must reach a predetermined operating level, whereas the maximum efficiency of the converter, i.e. the capacity to suppress the pollutant substances in an optimum manner, is associated with the fact that the air/fuel ratio of the mixture supplied to the engine must be kept close to the stoichiometric value,. i.e. within a pre-determined interval which includes the stoichiometric value itself.

When the engine has been cold-started, the problem exists of heating the catalytic converter quickly up to the predetermined operating temperature, at the same time keeping the emissions of pollutants within the values pre-determined by the standards in force.

In order to solve this problem, it is known to use a method for controlling the injection and ignition, according to which, within the context of a single engine cycle, a rich mixture is supplied to a first number of cylinders, and a weak mixture is supplied to a second number of cylinders, such that in general the mixture which is supplied to the engine during the cycle is substantially stoichiometric. For each cylinder, the injection of fuel takes place before the compression stroke of the cylinder itself. The combustion in the cylinders supplied with rich mixture generates exhaust gases which are rich in carbon monoxide, whereas the combustion in the cylinders which are supplied with weak mixture generates exhaust gases which are rich in oxygen.

The carbon monoxide and the oxygen thus generated give rise to an exothermic reaction, which provides heat along the exhaust pipe, thus making it possible to accelerate the heating of the catalytic converter.

In addition, in the cylinders which are supplied with rich mixture, the moment of priming of the fuel is delayed relative to the nominal moment of priming, such that the increase of torque caused by the combustion of the rich mixture is partially compensated by a decrease in torque caused by the ignition delay. However, in the cylinders which are supplied with weak mixture, the ignition of the mixture takes place at the moment of nominal priming.

Although the above-described known method makes it possible to speed up the heating of the catalytic converter, and to keep the emissions within pre-determined limits, it has a disadvantage caused by the fact that the production of heat is obtained by means of operations (such as the enriching of the mixture, and the delay in the moment of ignition) which adversely affect the generation of the torque, relative to the torque value which is required in the actual operating condition of the engine. In fact, the compensation between the increase in torque which is caused by enriching of the mixture, and the decrease in torque which is caused by the delay in priming, is never perfect, with the consequence that the torque which is transmitted to the engine shaft, by the cylinders which are supplied with rich mixture, is different from the torque transmitted by the cylinders which are supplied with weak mixture. Thus, as far as the generation of torque is concerned, the various cylinders behave in a slightly different manner relative to one another, and this therefore affects slightly the driving control of the vehicle.

SUMMARY OF THE INVENTION

The object of the present, invention is thus to provide a method for controlling the injection and ignition in a direct-injection endothermic engine, which makes it possible to accelerate the heating of the converter, thus minimising the emissions of pollutants, and which, at the same time, overcomes the said disadvantage.

According to the present invention, a method is provided for controlling the injection and ignition of the air/fuel mixture in a direct-injection endothermic engine, in order to accelerate the heating of a catalytic converter which is disposed along an exhaust pipe of the engine itself, the method being characterised in that it comprises the steps of:

a) executing, during a single cycle of the engine, and for each cylinder of the engine itself, at least a first injection of fuel, during suction stroke and/or compression stroke of the cylinder itself, in order to supply a weak mixture;

b) priming combustion in each cylinder, at a priming moment which is pre-determined such that the combustion in each cylinder generates the same torque; and c) executing, in at least one cylinder of the engine, a second injection of fuel, during the end of the expansion stroke and/or in the exhaust stroke of the cylinder itself, such that the ratio of air/fuel of the mixture as a whole which is supplied to the cylinder, is close to the stoichiometric value; the fuel which is injected in the said second injection giving rise to residual combustion in the presence of the oxygen-rich exhaust gases, which are derived from the combustion of the weak mixture; the residual combustion not affecting the torque generated, and producing heat in order to heat the catalytic converter.

By this means, the production of the heat which is necessary in order to speed up the heating of the catalytic converter is separate from the generation of the torque, since the ignition of the mixture supplied with the first injection generates torque, whereas the residual combustion of the fuel supplied in the second injection takes place when the exhaust valve which is associated with the cylinder is already open, and thus it does not affect adversely the torque transmitted to the engine. In addition, all the cylinders generate the same torque, and consequently the driving control of the vehicle is not affected.

BRIEF DESCRIPTION OF THE DRAWINGS

The invention is now described with reference to the attached drawings, which illustrate a non-limiting embodiment, in which.

DETAILED DESCRIPTION OF THE INVENTION

Figure 1:
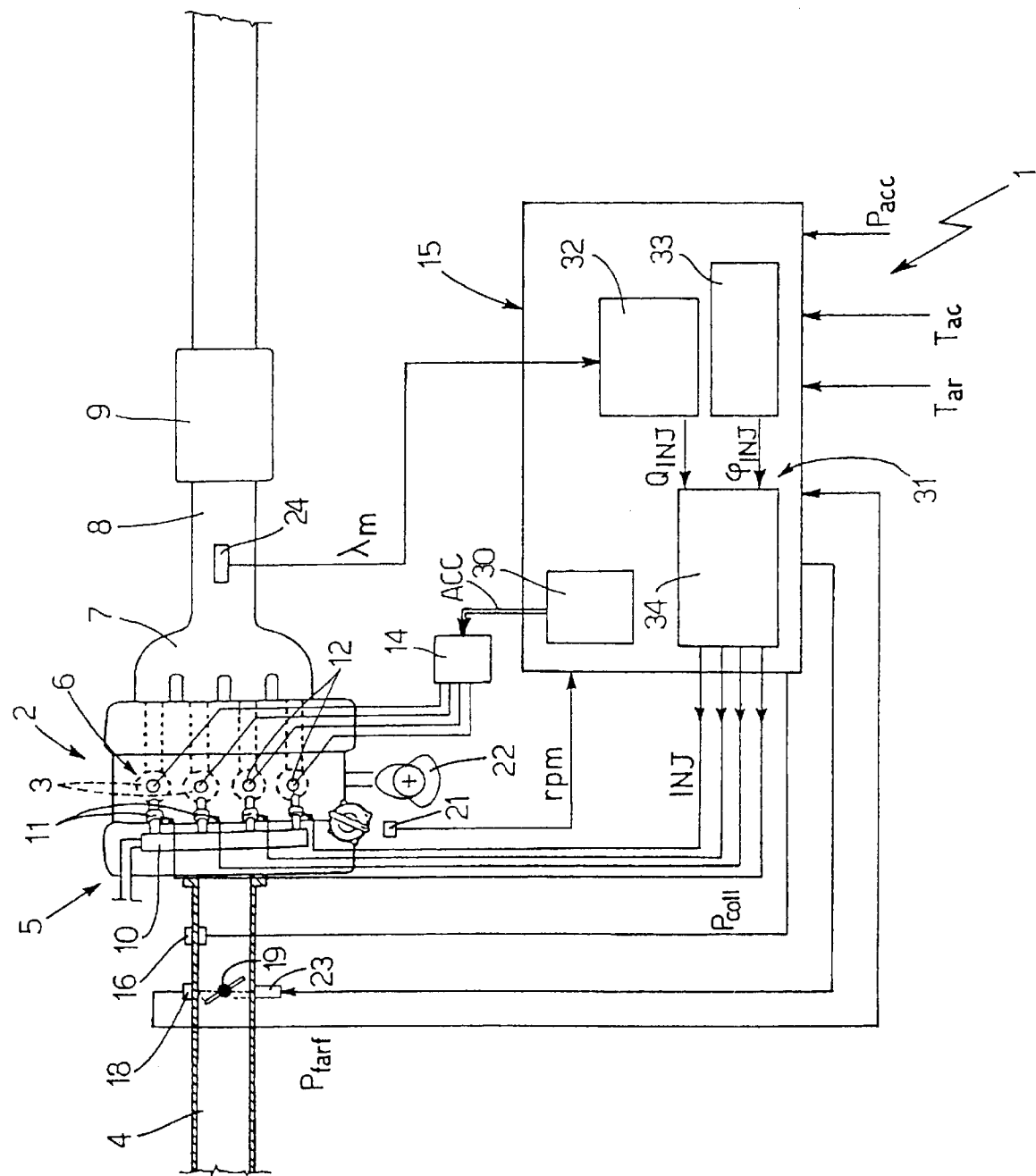
FIG. 1 illustrates schematically a device to control the injection and ignition in a direct-injection endothermic engine, which implements the method according to the present invention.

With reference to FIG. 1, 1 indicates schematically a control device for a direct-injection endothermic engine 2. In the example illustrated, the engine 2 is a petrol engine with four cylinders indicated by the reference number 3, each of which defines a respective combustion chamber at its own upper end.

The engine 2 has a suction manifold 4 for supply of a flow of air towards the cylinders 3, an injection device 5 to supply the petrol directly to the combustion chambers, and an ignition device 6 to prime the combustion of the air/petrol mixture within the cylinders 3.

The engine 2 additionally has an exhaust manifold 7, which can convey the burnt gases ejected from the combustion chambers into an exhaust pipe 8, along which there is disposed a catalytic converter 9 (of a known type), which can suppress the pollutant substances present in the exhaust gases, before the latter are emitted into the external environment.

The injection device 5 comprises a fuel manifold 10, inside which there accumulates the high-pressure petrol to be supplied to the cylinders 3, and a plurality of injectors 11, each of which is connected to the fuel manifold 10, and can be controlled in order to supply the fuel directly inside the combustion chambers. In the example illustrated, the injection device 5 has four injectors 11, each of which faces a respective and separate combustion chamber of the engine 2.

The ignition device 6 comprises a plurality of spark plugs 12, each of which is disposed at a respective cylinder 3, and can be piloted by an ignition circuit 14, in order to prime the combustion of the mixture inside the cylinder 3 itself.

The control device 1 comprises an electronic engine-control system 15, which co-operates with a plurality of sensors disposed in the engine 2, in order to receive as input a plurality of data signals, which are measured in the engine 2 itself. In particular, the system 15 is connected to a pressure sensor 16, in order to receive a signal Pcoll, which is indicative of the pressure in the suction manifold 4, and co-operates with the position sensor 18, which can detect the position of the throttle valve 19, which is disposed along the exhaust pipe 4, in order to regulate the flow of air admitted into the cylinders 3. The system 15 also receives an rpm signal from an angular speed sensor 21, which is disposed at the engine shaft 22, and is connected to two temperature sensors (not shown), in order to receive a signal Tar and a signal Tac, which are indicative, respectively, of the temperature of the air, and the temperature of the cooling water. The electronic system 15 also receives as input a signal Pacc, relative to the position assumed by the accelerator pedal (not shown), and can control an actuator 23, to regulate the position of the throttle valve 19 (and thus the flow of air admitted into the cylinders), according to the signal Pacc, and the present operating condition of the engine 2.

In addition, the system 15 co-operates with an oxygen sensor 24 of a known type, which is disposed along the exhaust pipe 8, downstream from the catalytic converter 9, is sensitive to the oxygen ions present in the exhaust gases, and can supply to the system itself a signal $\lambda_m$, which is correlated to the stoichiometric composition of the exhaust gases, and thus to the ratio of air/petrol of the mixture as a whole which is supplied to the engine 2.

The system 15 can control both the injectors 11, in order to regulate the injection of petrol into the combustion chambers, and the ignition circuit 14, in order to regulate the moments of ignition of the mixture in the various cylinders 3. In particular, inside the system 15, there are two control circuits, indicated as 30 and 31, of which the circuit 30 can control the ignition circuit 14 by means of emission of signals ACC, which are indicative of the actual moments of priming of the combustion in the cylinders 3. On the other hand, the circuit 31 can control the opening and closure of each injector 11, by means of emission of a respective signal INJ, which is indicative of the time interval within which the injection of fuel must take place in the combustion chamber.

The control circuit 31 in turn comprises a calculation block 32, which can calculate, for each cylinder 3, the quantity of petrol $Q_{inj}$ which must be supplied to the cylinder itself, corresponding to each injection. The circuit 31 additionally has a calculation block 33 which, for each injection, can calculate the injection phase $\phi_{inj}$ relative to this injection, i.e. the time interval which elapses, for example, between the moment when the injection must end, and the moment in which the piston which is associated with the cylinder reaches the top dead centre PMS. The calculation blocks 32 and 33 then supply the quantity of petrol $Q_{inj}$ to be injected and the injection phase $\phi_{inj}$ to a processing and activation block 34, which, on the basis of these values, can generate the control signal INJ for the injector 11.

According to the present invention, the control device 1 can implement a strategy for controlling the injection and ignition, which is designed to accelerate the heating of the catalytic converter 9, after a so-called "cold" start of the engine 2.

The strategy, which is described hereinafter, is active when the following conditions are established:

the temperature signals Tar and Tac (relative to the temperature of the air in the suction manifold 4 and to the temperature of the cooling water) read by the system 15 when the engine is started, assume values within respective pre-determined intervals; and the time which elapses after the moment when the engine is started, is within a pre-determined time interval.

Figure 2:
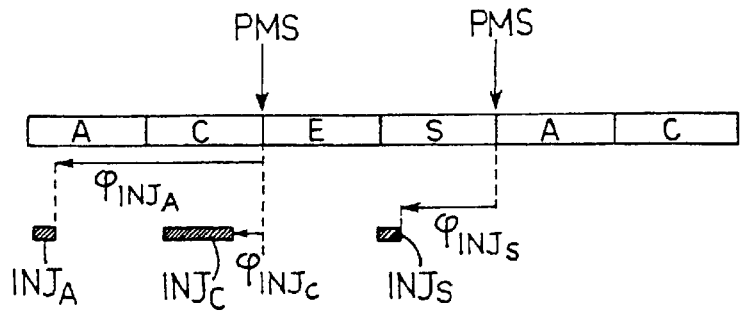
FIG. 2 illustrates, relative to a cylinder of the engine, the temporal succession of the injections of fuel, which are carried out in the cylinder according to the method which is the subject of the invention.
Figure 3:
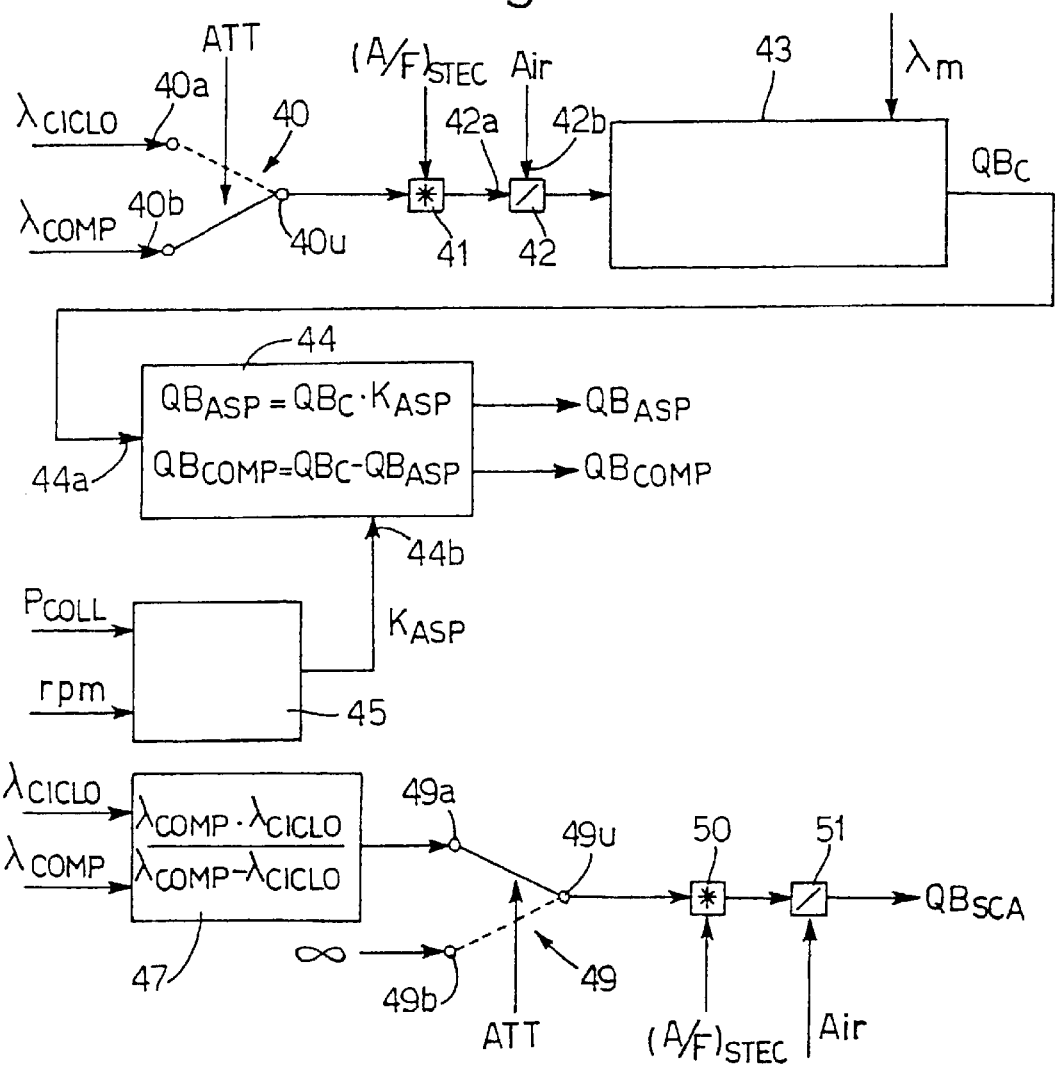
FIG. 3 illustrates schematically the calculation chain, which is designed to determine the quantities of fuel which must be supplied to the cylinder during the injections in FIG. 2.

The strategy is now described with reference to FIG. 2, which illustrates the succession of the steps relative to a cylinder 3 of the engine 2. In particular, A, C, E and S indicate respectively the strokes of suction, compression, expansion and exhaust.

According to the strategy, relative to a single combustion cycle of the cylinder 3, at least one injection of petrol is carried out during the strokes of suction A and/or compression C, such as to supply as a whole a weak mixture to the cylinder 3, i.e. a mixture characterized by air/fuel ratio which is higher than the stoichiometric air/fuel ratio.

Preferably, but not necessarily, two injections $INJ_A$ and $INJ_C$ are carried out (FIG. 2), of which the injection $INJ_A$ is carried out during the suction stroke A, in order to create a homogeneous mixture in the cylinder, whereas the injection $INJ_C$ is carried out during the stroke C of the cylinder itself, in order to create a mass of petrol, which is stratified in the combustion chamber above the head of the piston. The weak mixture which is supplied as a whole to the cylinder 3 in the strokes A and C, is then ignited at a predetermined priming moment, i.e. with pre-determined spark advance with respect to the moment in which the piston reaches the top dead center PMS in the compression stroke C. This combustion transmits torque to the engine shaft 22, and gives rise to oxygen-rich exhaust gases.

According to the invention, at least one subsequent injection $INJ_S$ is carried out at the end of the expansion stroke E, and/or during the exhaust stroke S. The quantity of petrol which is injected during this injection $INJ_S$ is such as to ensure that the ratio between the quantity of air sucked in, and the quantity of petrol as a whole which is supplied in the entire suction-compression-expansion-exhaust cycle, is equivalent to a calibration value which is close to the value of the stoichiometric air/petrol ratio.

The fuel which is injected during the injection $INJ_S$, in the presence of the exhaust gases which are still ignited, and are derived from the combustion of the weak mixture, can burn the excess oxygen which is present in these gases, generating heat towards the catalytic converter 9, without detracting from the generation of torque. In other words, the fuel relative to the injection $INJ_S$ gives rise to residual combustion, which takes place when the exhaust valve associated with the cylinder 3 is already open; this residual combustion does not detract from the generation of torque, and simply supplies heat along the exhaust pipe 7, in order to accelerate the heating of the catalytic converter 9.

According to a first type of application of the method according to the invention (see FIG. 4), relative to a single cycle CL of the engine, the injection $INJ_S$ is carried out in the exhaust stroke, within a single cylinder 3, whereas in the remaining cylinders 3, the injection is carried out only during suction and/or compression strokes, using the above-described methods.

By this means, all the cylinders 3 of the engine 2 generate the same torque, and the disadvantage of the control methods which are known and previously described are overcome, since there is elimination of these variations of torque which cause problems relative to ease of driving.

Figure 4:
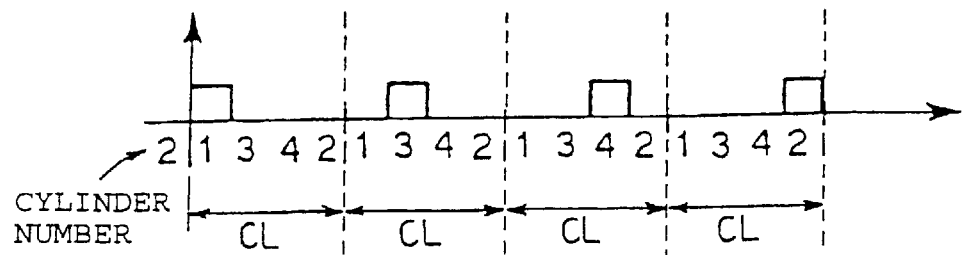
FIG. 4 illustrates an application of the method, relative to a four-cylinder engine.

As shown in FIG. 4, the cylinder in which the injection $INJ_S$ is carried out is then rotated, according to a predetermined law of rotation, with continuation of the cycles CL of the engine, each cycle CL representing a rotation of 720° of the engine shaft 22. Thus, for example, the first cylinder provides heat during the first cycle CL of the engine, the third cylinder provides heat during the second cycle CL, the fourth cylinder provides heat during the third cycle CL, and the second cylinder provides heat during the fourth cycle CL. It is apparent that the law of rotation can be other than that illustrated, and is based on the fact s that all the cylinders are rendered homogeneous from the functional point of view.

In addition, according to the invention, it is possible to vary the quantity of heat which is generated during the exhaust stroke, and thus the speed of heating of the catalytic converter 9, by varying the number of cylinders in which the additional injection $INJ_S$ is carried out in a single cycle CL of the engine.

Figure 5:
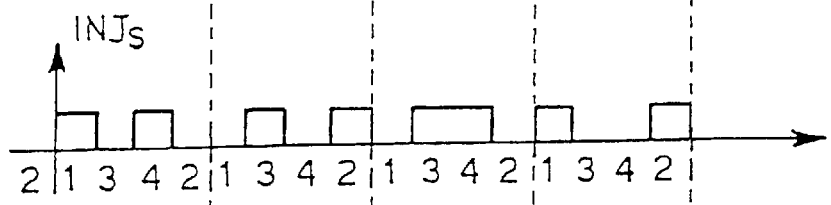
FIGS. 5, 6 and 7 represent respective variants of the application illustrated in FIG. 4.
Figure 6:
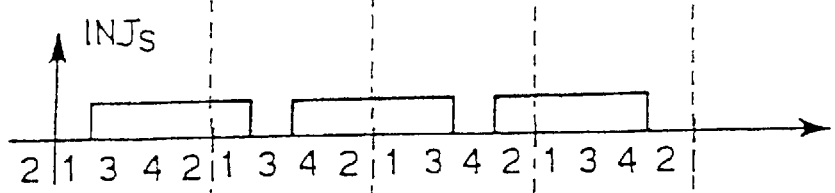
Figure 7:
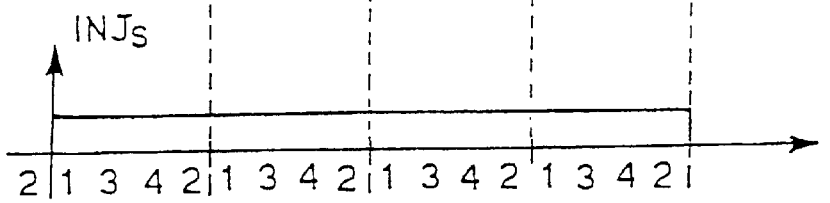

In fact, according to the quantity of heat which must be generated in the exhaust stroke in order to heat the catalytic converter 9, it is possible to decide to carry out the injection $INJ_S$ in a single cylinder (FIG. 4), in two cylinders (FIG. 5), in three cylinders (FIG. 6), or in all the cylinders (FIG. 7).

In particular, if the additional injection $INJ_S$ is carried out in all the cylinders, the quantity of heat supplied to the catalytic converter 9 is maximized, and the time necessary in order to heat the converter to the predetermined operating temperature is minimized. the quantity of petrol to be injected during each injection. This calculation chain is implemented in the calculation block 32 illustrated in FIG. 1.

On the basis of the value of some input signals for the system, such as the signal for the rpm (number of revolutions per minute), and the signal Pcoll (pressure in the suction manifold), two objective parameters, which are indicated as $\lambda_{CICLO}$ and $\lambda_{COMP}$, are generated by means of electronic tables, not shown. In particular, the parameter $\lambda_{CICLO}$ represents the objective titre of the mixture supplied to a cylinder, relative to an entire suction-compression-expansion-exhaust cycle, whereas the parameter $\lambda_{COMP}$ represents the objective titre of the mixture supplied to a cylinder, relative to suction-compression strokes, and thus the objective titre of the mixture which is designed to supply the torque during activation of the strategy which makes it possible to speed up heating of the catalyst.

The parameters $\lambda_{CICLO}$ and $\lambda_{COMP}$ are supplied to respective inputs 40a and 40b of a selector 40, which for example consists of a switch, which has an output 40u. The inputs 40a and 40b can communicate alternately with the output 40u, on the basis of the value of a bistable control signal ATT, which indicates whether or not the conditions of activation of the strategy have been met, for heating of the catalytic converter 9. In particular, the selector 40 connects the input 40b to the output 40u, if the conditions of activation of the strategy are met.

The output 40u is then connected to a multiplier block 41, which can multiply the parameter input for the stoichiometric air/petrol ratio $(A/F)_{STEC}$. The output of the block 41 is supplied to an input 42a of a division block 42, which has a further input 42b, to which there is supplied the air flow Air. The block 42 can divide the air flow Air by the signal which is present at the input 42b, in order to obtain the objective quantity of petrol $QB_N$ which must be injected as a whole in the cylinder, before the end of the compression stroke.

The quantity of petrol $QB_N$ is then supplied to a correction block 43, which can carry out at least one correction, in order to take into consideration the present value of the signal $\lambda_m$ which is obtained from the oxygen sensor 24, such as to obtain the quantity of petrol $QB_C$ to be injected, controlled in a closed loop. This correction can for example be a multiplicative correction, such as to obtain $QB_C = QB_N$ K, where K is a parameter which is a function of the value of the parameter $\lambda_m$.

The correction block 43 can also be more complex, and can carry out additional corrections, not shown.

The output of the correction block 43, i.e. the correct quantity of petrol $QB_C$ to be supplied as a whole to the cylinder, during suction and compression strokes, is supplied to an input 44a of a processing block 44, which has another input 44b. There is supplied to the input 44b a parameter $K_{ASP}$, which is obtained as output from a table 45, which receives as input the number of revolutions rpm, and the pressure Pcoll of the suction manifold 4. The parameter $K_{ASP}$ represents the percentage of fuel which is to be injected during the suction stroke A, i.e. during the injection $INJ_A$ (see FIG. 2).

The processing block 44 can supply as output the quantities of petrol $QB_{ASP}$ and $QB_{COMP}$ to be supplied to the cylinder, respectively during the suction stroke and during the compression stroke (i.e. during the injections $INJ_A$ and $INJ_C$) In particular, the quantities of petrol $QB_{ASP}$ and $QB_{COMP}$ are calculated according to the expressions;

$$QB_{ASP} = QB_C \cdot K_{ASP}$$

$$QB_{COMP} = QB_C - QB_{ASP}$$

The parameters $\lambda_{CICLO}$ and $\lambda_{COMP}$ are also supplied to a processing block 47, which can process them in order to supply to an input 49a of a selector 49 the parameter defined by the following expression:

$$\frac{\lambda_{COMP} \cdot \lambda_{CICLO}}{\lambda_{COMP} - \lambda_{CICLO}}$$

The selector 49 has a further input 49b, to which there is supplied an extremely high value (indicated by the infinity symbol o), and an output 49u. The inputs 49a and 49b can communicate alternately with the output 49u, on the basis of the value of the signal ATT, which indicates whether or not the conditions of activation of the strategy, for heating of the catalytic converter 9 have been met In particular, the selector 49 connects the input 49a to the output 49u, when the conditions of activation of the strategy have been met.

The output 49b is then connected to a multiplier block 50, which can multiply the parameter input for the stoichiometric air/fuel ratio $(A/F)_{STEC}$. The output of the block 50 is supplied to input 51a of a divider block 51, which has a further input 51b, to which there is supplied the air.flow Air. The block 51 can divide the air flow Air by the signal which is present at the input 51b, in order to obtain the quantity of petrol $QB_{SCA}$ which is to be injected during the exhaust stroke of the cylinder, in order to supply heat towards the catalytic converter 9.

When the conditions of activation of the strategy have been obtained, the selectors 40 and 49 connect the inputs 40b and 49a to the outputs 40u and 49u, and in the cylinders in which it is required to carry out the injection $INJ_S$, the quantity of petrol $QB_{SCA}$, which is supplied during the exhaust stroke, is thus defined by the following expression:

$$QB_{SCA} = \frac{Air}{\frac{\lambda_{COMP} \cdot \lambda_{CICLO} \cdot (Air/F)_{STEC}}{\lambda_{COMP} - \lambda_{CICLO}}}$$

On the other hand, the quantity of petrol which is used in the combustion, in order to generate torque, is provided by the sum of the quantities of petrol which are injected in the injections $INJ_A$ and $INJ_C$ (see FIG. 2), i.e.:

$$QB_{ASP} + QB_{COMP} = \frac{Air}{\lambda_{COMP} \cdot (Air/F)_{STEC}}$$

without the correction carried out by block 43.

The combustion which generates torque takes place in the same manner in all the cylinders 3, whereas the residual combustion takes place only for the cylinders in which the injection $INJ_S$ is carried out.

If, on the other hand, the conditions of activation are not obtained, the additional injection $INJ_S$ is not carried out in any cylinder 3 ($QB_{SCA} = 0$).

When the general quantity of petrol $Q_{INJ}$ to be injected at each injection has been calculated, the injection phase $\phi_{INJ}$ is then calculated via the calculation block 33, and finally, the processing block 34 activates the control signal INJ for the corresponding injector 11.

It is apparent from the foregoing description that during activation of the strategy which is designed to speed up heating of the catalytic converter 9, the mixture which is supplied to the cylinders in order to generate torque, is substantially weak. Within specific limits, this does not make it impossible to continue to meet the requirement for torque created by the driver, by pressing the accelerator pedal. In fact, since pressing the accelerator pedal does not control directly the position of the throttle valve 19, the system 15 can regulate the position of the valve itself by means of the actuator 23, such that the mixture supplied to the cylinders 3 during the compression stroke is weak, and the combustion in the cylinders 3 gives rise to the torque required by the driver.

The control method described has the advantage that it makes it possible to heat the catalytic converter 9 up to the required temperature within times which are very short, compared with the known methods. In fact, if the injection $INJ_S$ is carried out in each cylinder (FIG. 7) of the engine, all the cylinders contribute directly and autonomously towards the production of heat, unlike the situation according to the control methods of the known type.

Finally, it can be noted that during activation of the strategy, the emissions of pollutants are restricted to minimum levels.

What is claimed is:

1. Method for controlling the injection and ignition of the air/fuel mixture in a direct-injection endothermic engine, in order to accelerate heating of a catalytic converter, which is disposed along an exhaust pipe of the engine itself, comprising the steps of:

a) executing, during a single cycle of the engine, and for each cylinder of the engine itself, at least one injection of fuel, during a first half-cycle of the cylinder itself, in order to supply a weak mixture, the first half-cycle comprising a suction stroke and a compression stroke;

b) priming combustion in each cylinder, at a priming moment which is pre-determined such that combustion in each cylinder generates the same torque; and c) executing, in at least one cylinder of the engine, a second injection of fuel, during a second half-cycle of the cylinder itself when exhaust gases derived from the combustion of the weak mixture are still ignited, giving rise to a residual combustion which does not affect torque generated, and produces heat for heating of the catalytic converter; the second injection being such that an air/fuel ratio of the mixture supplied as a whole to the cylinder is stoichiometric and the second half-cycle comprising an expansion stroke and an exhaust stroke, wherein for each cylinder, at least two injections of fuel are carried out during said first half cycle, in order to supply as a whole said weak mixture to the cylinder itself; one of the two injections being carried out during the suction stroke, in order to create a homogeneous mixture in the cylinder, whereas the other injection is performed during the compression stroke, in order to create a mass of fuel, which is stratified above the head of the piston which is associated with the cylinder.

2. Method according to claim 1, wherein, during the continuation of the cycles of the engine, said at least one cylinder in which said further injection is executed, is selected on the basis of a pre-determined sequence of the cylinders.

3. Method according to claim 1, wherein said further injection is executed in all the cylinders of the engine, in order to maximize the production of heat, and minimize the time required in order to heat the catalytic converter up to a pre-determined operating temperature.

4. Method according to any one of the preceding claims, further comprising the step of calculating the quantity of fuel to be injected inside the cylinder, during each said injection, on the basis of two objective parameters $\lambda_{CICLO}$ and $\lambda_{COMP}$, of which the parameter $\lambda_{CICLO}$ represents the objective titre of the mixture which is supplied to the cylinder, relative to an entire suction-compression-expansion-exhaust cycle, whereas the parameter $\lambda_{COMP}$ represents the objective titre of the mixture which is supplied to a cylinder, relative to suction-compression strokes, and thus the objective titre of the mixture which is designed to provide the torque.

5. Method according to claim 4, wherein the actual quantity of fuel to be injected as a whole during suction stroke and compression stroke of the cylinder, is obtained by executing the following steps:

measuring the quantity of air which is sucked into the cylinder;

calculating the objective quantity of fuel to be supplied in the cylinder, during the said suction stroke and compression stroke, by means of the expression:

$$QB_{COMP} = \frac{Air}{\lambda_{COMP} \cdot (Air/F)_{STEC}}$$

in which $(Air/F)_{STEC}$ is the stoichiometric air/fuel ratio;

correcting said objective quantity of fuel, according to the value of an output signal of an oxygen sensor, which is disposed along the exhaust pipe, the output signal being correlated to the stoichiometric composition of the exhaust gases, and thus to the air/fuel ratio of the mixture as a whole which is supplied to the engine.

6. Method according to claim 5, wherein the actual quantity of fuel which must be injected in the suction stroke represents a specific percentage of the actual quantity of fuel which must be injected before the expansion stroke; said percentage being determined on the basis of the pressure in the suction manifold of the engine, and of the number of revolutions of the engine shaft.

7. Method according to claim 4, wherein the quantity of fuel which must be injected in the cylinder during said further injection is calculated according to the expression:

$$QB_{SCA} = \frac{Air}{\dfrac{\lambda_{COMP} \cdot \lambda_{CICLO} \cdot (Air/F)_{STEC}}{\lambda_{COMP} - \lambda_{CICLO}}}$$

in which Air represents the quantity of air which is sucked into the cylinder, $(Air/F)_{STEC}$ represents the stoichiometric air/fuel ratio, and $\lambda_{CICLO}$ and $\lambda_{COMP}$ are said objective parameters.

8. Method according to any one of the preceding claims, further comprising the preliminary step of detecting the values assumed by a plurality of data signals, which are correlated to an operative state of the engine, and of enabling execution of said further injection, only if said values detected fulfil pre-determined conditions.

* * * * *